United States Patent [19]

Dade et al.

[11] Patent Number: 5,783,893
[45] Date of Patent: Jul. 21, 1998

[54] MULTIPLE STATOR, SINGLE SHAFT ELECTRIC MACHINE

[75] Inventors: Thomas B. Dade, Poquoson; Chester A. Garis, Jr., Gloucester, both of Va.

[73] Assignee: Newport News Shipbuilding and Dry Dock Company, Newport News, Va.

[21] Appl. No.: 546,317

[22] Filed: Oct. 20, 1995

[51] Int. Cl.[6] ............................................. H02K 16/00
[52] U.S. Cl. ................................. 310/266; 310/114
[58] Field of Search ............................... 310/162, 166, 310/168, 254, 266, 42

[56] References Cited

U.S. PATENT DOCUMENTS

| | | | |
|---|---|---|---|
| 4,375,047 | 2/1983 | Nelson et al. | 318/48 |
| 4,517,484 | 5/1985 | Dacier | 310/266 |
| 4,651,040 | 3/1987 | Gerstner et al. | 310/166 |
| 4,714,853 | 12/1987 | Palmero et al. | 310/257 |
| 4,829,205 | 5/1989 | Lindgren | 310/166 |
| 5,107,156 | 4/1992 | Jaun et al. | 310/162 |
| 5,281,879 | 1/1994 | Satake et al. | 310/114 |
| 5,289,072 | 2/1994 | Lange | 310/266 |
| 5,345,133 | 9/1994 | Satake | 310/266 |
| 5,396,140 | 3/1995 | Goldie et al. | 310/268 |
| 5,525,851 | 6/1996 | Kumamoto et al. | 310/114 |

*Primary Examiner*—Steven L. Stephan
*Assistant Examiner*—Michael J. Wallace, Jr.
*Attorney, Agent, or Firm*—Lalos & Keegan

[57] ABSTRACT

An electric machine, such as a motor or generator, is configured in a machine housing with a cup-shaped rotor attached to a shaft rotatively supported in the housing, an inner stator coaxial with and enclosed by the rotor, and an outer stator coaxial with and enclosing the rotor. The inner and outer portions of the machine are separated by a magnetic isolator that divides and supports inner and outer portions of the rotor. The magnetic isolator, which supports inner and outer sets of permanent magnets in one embodiment and inner and outer squirrel cage rotor assemblies in another embodiment is preferably made of non-magnetic stainless steel but may also be made of titanium, brass, aluminum, bronze or magnesium, or any material that provides magnetic isolation between the inner and outer portions of the machine.

10 Claims, 4 Drawing Sheets

MULTIPLE STATOR, SINGLE SHAFT ELECTRIC MACHINE

FIELD OF THE INVENTION

The present invention is related to electric machines such as motors and generators, and more particularly to radial gap electric machines with a rotor interacting with both an inner stator and an outer stator.

BACKGROUND OF THE INVENTION

It has been known to configure certain electrical machines (i.e. generators and motors) with a cup-shaped rotor attached to a shaft, an inner stator coaxial with and enclosed by the rotor, and an outer stator coaxial with and enclosing the rotor. Examples of machines with such configuration are disclosed in the U.S. patents issued to Fawzy (U.S. Pat. No. 3,845,338), Satake (U.S. Pat. No. 5,345,133) and Fisher et al. (U.S. Pat. No. 5,212,419).

Certain of such prior machines are further configured to maximize flux coupling between the inner and outer portions of the machine. As an example, in U.S. Pat. No. 4,517,484 issued to Dacier, the rotor includes two sets of magnetic pole pieces, inner and outer, attached to the inner and outer sides, respectively, of a rim. The flow of flux is radial through the rotor passing through the inner pole pieces, the rim and the outer pole pieces, and then tangential through the magnetic cores of the inner and outer stators. To enhance flow of the magnetic flux, the inner and outer pole pieces mounted on either side of the rim are arranged to form radial pairs such that inner and outer pole pieces in facing relationship have opposing signs or polarities.

Although it is claimed by Dacier that his double stator machine is capable of continued operation in case of damage to the winding of one of the two stators, in most cases such continued operation will result in further damage to the faulty stator. In most cases of stator damage, the windings of the damaged stator are shorted. In Dacier's machine, with flux being coupled from one side of the rotor to the other, continued turning of the rotor will induce current in the damaged stator windings causing even further damage.

SUMMARY OF THE INVENTION

The present invention overcomes the disadvantages of the prior art by providing a flexible multiple stator, single shaft machine that is capable of independent operation with the rotor interacting solely with the inner stator or solely with the outer stator. In the present invention, this advantage is achieved by a unique rotor configuration that magnetically isolates the inner rotor portion/inner stator from the outer rotor portion/outer stator.

The machine of the present invention can be configured, for example, as either a permanent magnet (PM) motor or as an induction motor. In either case, the rotor magnetic poles (formed by either permanent magnets in a PM motor or created by current induced in rotor conductors in an induction motor) are divided into inner rotor poles and outer rotor poles, separated by a magnetic isolator. The magnetic isolator, which supports the permanent magnets in the PM motor or inner and outer squirrel cage rotor assemblies in the induction motor, is preferably made of non-magnetic stainless steel but may also be made of titanium, brass, aluminum, bronze or magnesium.

In order to further isolate the two stators from one another and impede the flow of magnetic flux through the rotor, the inner and outer rotor magnetic poles in facing relationship are arranged to have a like magnetic polarity, thus tending to repel the flow of magnetic flux from one side of the rotor to the other.

In the present invention, if one of the stators is damaged, the isolation features of the present invention prevent undesirable induction of current in the damaged stator even while the machine continues to operate with the rotor interacting with the working stator. In the induction motor embodiment of the present invention, the rotor conductors are excited from the stator. If one stator is damaged, there will be no source of induced current on the damaged side of the machine. In the PM embodiment, the permanent magnets are removed from the rotor on the damaged stator side, thus preventing any induced current in the damaged stator windings.

DETAILED DESCRIPTION

Figure 1:
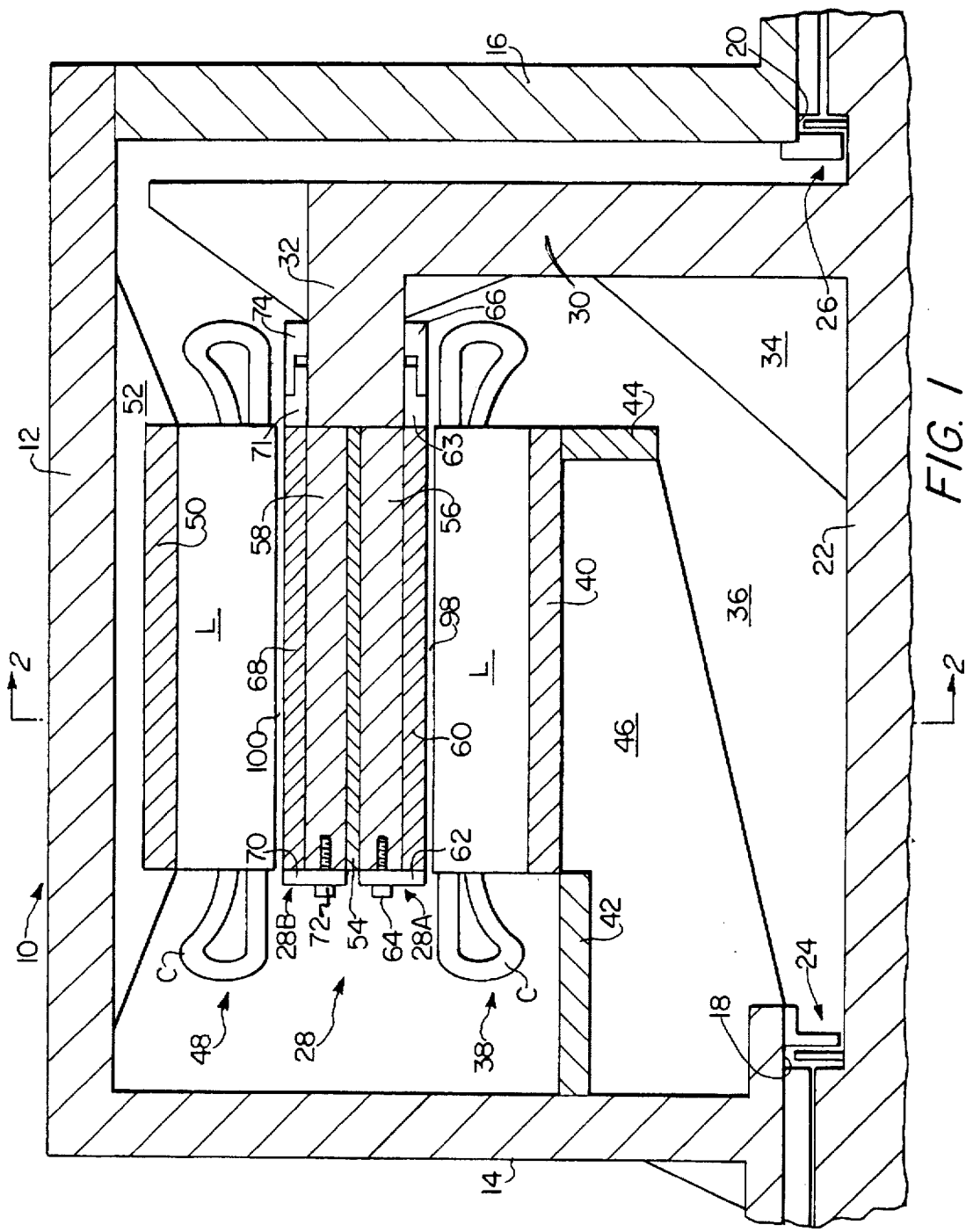
FIG. 1 is a side sectional view of an upper half of a permanent magnet (PM) motor embodiment of the present invention, it being understood that the machine is generally circular in cross-section and the lower half is a mirror image of the upper half.
Figure 2:
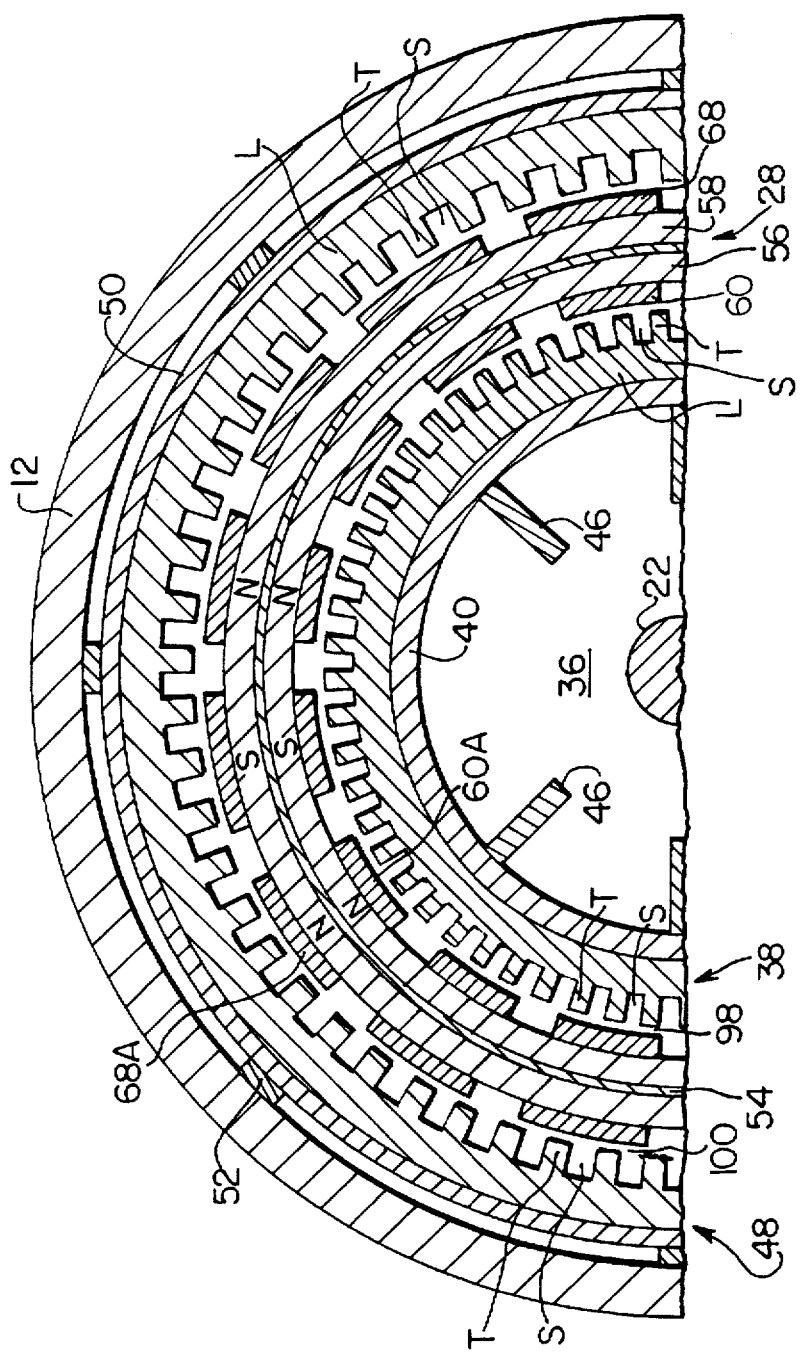
FIG. 2 is an end sectional view along line 2—2 of FIG. 1.

With reference to FIGS. 1 and 2, the electrical machine 10 of the present invention is shown as a permanent magnet (PM) motor including a housing 12. Housing 12 will include two end plates 14, 16 to enclose the housing. End plate 14 is preferably permanently attached to housing 12 and may be integrally formed therewith, as shown. End plate 16 is preferably removable to allow access to the inside of machine 10. End plates 14, 16 include openings 18, 20 concentric with the central axis of the housing for admitting shaft 22, which is rotatively supported in annular bearing assemblies, shown generally as 24 and 26. Shaft 22 is connected to rotor 28 through annular extension member 30 and axially extending ring member 32.

Shaft 22 and members 30 and 32 may be integrally formed or connected together in any suitable manner. Rotor 28 is generally cylindrical with a central opening 36, but when connected with members 30 and 32 it is generally cup shaped. Corner braces 34, which are circumferentially spaced about the motor, are attached between the shaft 22 and extension member 30 to provide support.

Inner stator 38 is secured within housing 12 in central opening 36 of rotor 28 and is separated from rotor 28 by inner air gap 98. Inner stator 38 is coaxial with rotor 28 and is supported by inner stator ring 40. Stator ring 40 is connected to housing 12 and supported therein by a brace ring 42, an end ring 44 and a plurality of inner support brackets 46 that are circumferentially and equally spaced around the inside circumference of the brace ring 42. The support brackets 46 are attached to end plate 14, the inner circumference of brace ring 42 and stator ring 40, and to end ring 44.

Outer stator 48 is secured within housing 12 in surrounding relationship to and coaxial with rotor 28, and is separated from rotor 28 by outer air gap 100. Outer stator 48 is supported by outer stator ring 50 that is connected to and supported by a plurality of circumferentially and equally spaced supports 52 that are attached to the inside of housing 12. Inner stator 38 and outer stator 48 are conventionally formed with, for example, a plurality of thin disc laminates (identified generally as L in FIG. 1) cut to form teeth T (FIG. 2) spaced about the circumference of each stator, and a plurality of insulated, conductive coils (identified generally as C in FIG. 1) wound around the teeth T in the spaces S therebetween (FIG. 2, with conductors omitted for illustration), as is conventional.

Rotor 28 is divided about its circumference into an inner rotor section 28A and an outer rotor section 28B by a generally cylindrical rotor isolator 54. Rotor isolator 54 magnetically separates and also supports rotor inner back-iron 56 and rotor outer backiron 58. Rotor isolator 54 preferably is made of non-magnetic stainless steel, but may also be made of titanium, brass, aluminum, bronze or magnesium, or any material that is capable of magnetically isolating the inner and outer portions of the rotor 28. In the embodiment shown in FIGS. 1 and 2, one or more, and preferably a set of several, equally spaced, permanent magnets 60 are attached to the inner backiron 56 by a magnetic carrier assembly 62, 63. Magnetic carrier assembly 62, 63 is attached to inner backiron 56 with dovetail keys that slide into dovetail grooves cut into backiron 56, with the base of the carrier assembly 62, 63 being attached to the base of the permanent magnets 60. Magnetic carrier assembly 62, 63 is secured to inner backiron 56 with bolts 64 and inner magnet retainer ring 66.

Similarly, one or more, and preferably a set of several, equally spaced, permanent magnets 68 are attached to the outer backiron 58 by a magnetic carrier assembly 70, 71. Magnetic carrier assembly 70, 71 is attached to outer backiron 58 with dovetail keys that slide into dovetail grooves cut into backiron 58, with the base of the carrier assembly 70, 71 being attached to the base of the permanent magnets 68. Magnetic carrier assembly 70, 71 is secured to outer backiron 58 with bolts 72 and outer magnet retainer ring 74.

In addition to rotor isolator 54 providing magnetic separation between the inner and outer portions of the motor, the flow of magnetic flux from one rotor side to the other is preferably further impeded by the configuration of the permanent magnets wherein the inner permanent magnets 60 and the outer permanent magnets 68 in facing relationship have like poles or polarities. For example, with reference to FIG. 2, radially aligned permanent magnetic pair 60A, 68A is arranged such that the north poles face each other across magnetic isolator 54. As shown, the inner permanent magnets 60 are oriented to form a set of inner magnetic poles facing the outer permanent magnets 68, and the outer permanent magnets are oriented to form a set of outer magnetic poles facing the inner permanent magnets 60. Preferably, throughout the sets, inner and outer magnetic poles in facing relationship have the same polarity.

Figure 3:
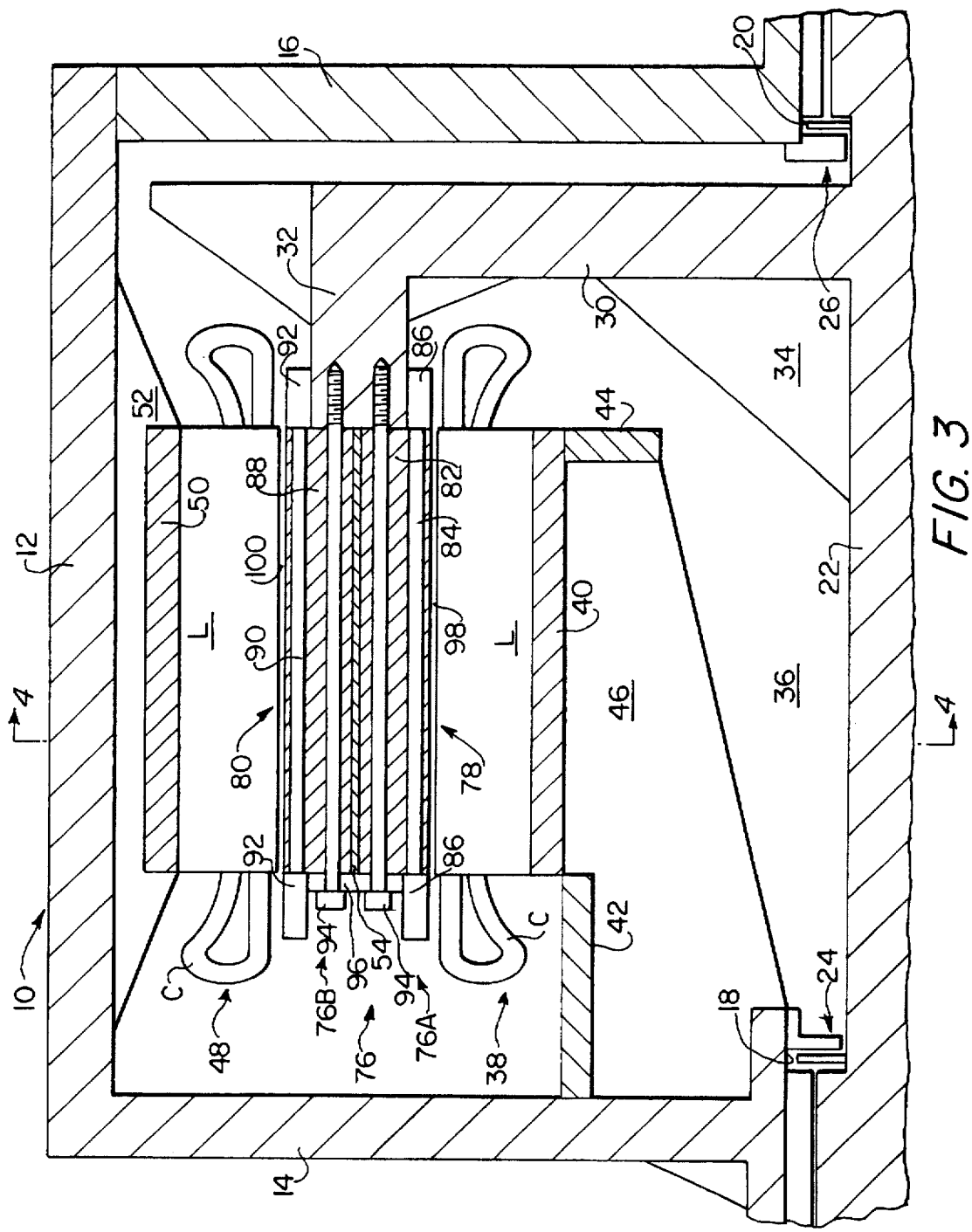
FIG. 3 is a side sectional view of an upper half of an induction motor embodiment of the present invention, it again being understood that the machine is generally circular in cross-section and the lower half is a mirror image of the upper half.
Figure 4:
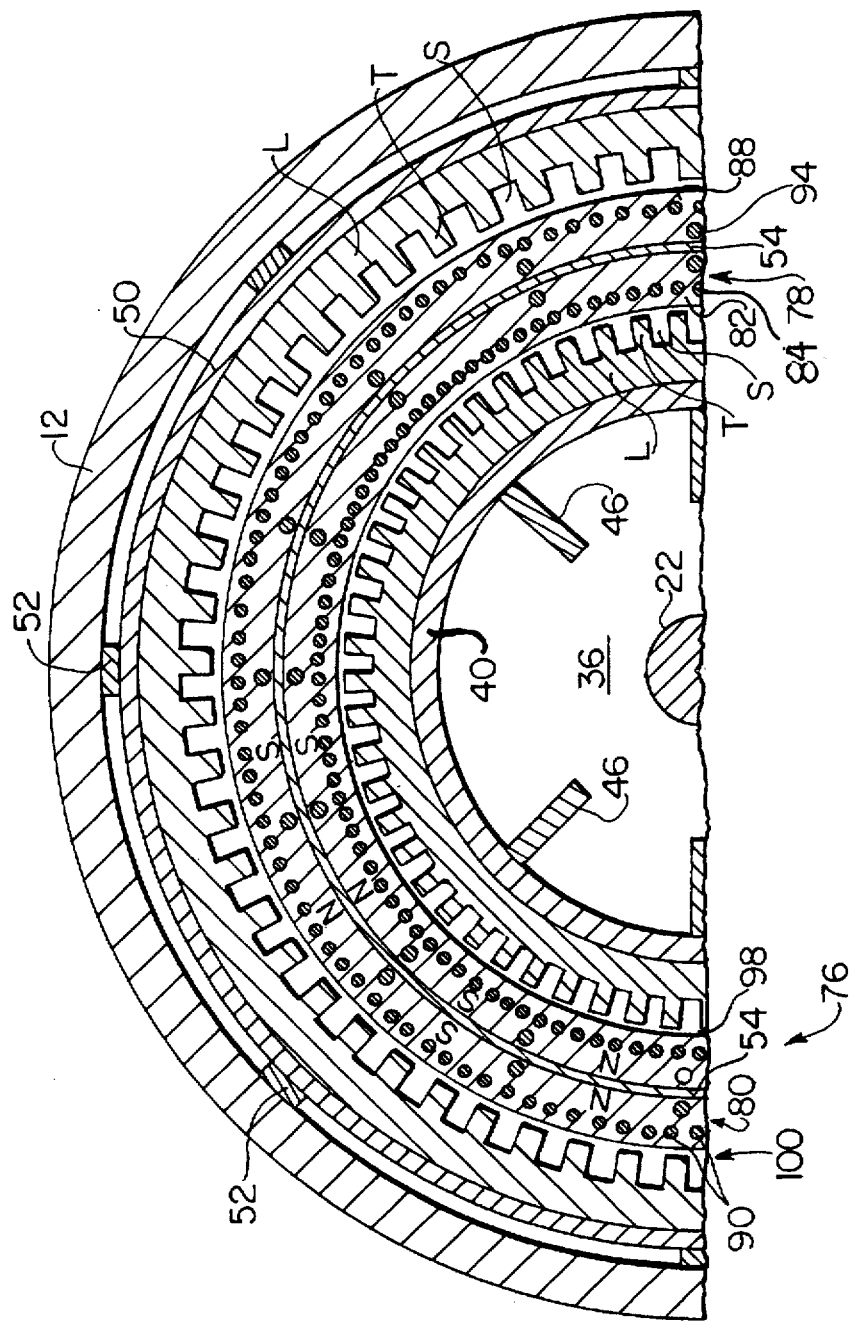
FIG. 4 is an end sectional view along line 4—4 of FIG. 3.

An induction motor embodiment of the electrical machine 10 of the present invention is shown in FIGS. 3 and 4. Structure that is common to both the permanent magnet motor and induction motor embodiments have like numbers in all figures and their description will not be repeated in this discussion of the induction motor embodiment. The primary difference between the two embodiments is in the rotor. With reference to FIGS. 3 and 4, rotor 76 is divided about its circumference into an inner rotor section 76A and an outer rotor section 76B by generally cylindrical rotor isolator 54. Rotor isolator 54 magnetically separates and also supports rotor inner squirrel cage assembly 78 and outer squirrel cage assembly 80. As previously discussed, rotor isolator 54 is preferably made of non-magnetic stainless steel, but may also be made of titanium, brass, aluminum, bronze or magnesium, or any material that provides magnetic isolation between the inner and outer portions of the rotor 76.

The inner squirrel cage assembly 78 includes inside rotor laminations 82, inner rotor conductors 84 and inner rotor end conductors 86. The outer squirrel cage assembly 80 includes outer rotor laminations 88, outer rotor conductors 90 and outer rotor end conductors 92. The inner and outer rotor laminations are secured to axially extending ring member 32 of rotor 76 with through bolts 94 and rotor lamination compression ring 96.

Rotating fields set up by currents flowing in the inner and outer stators induce voltages in the respective inner and outer rotor conductors, which in turn cause current to flow in such conductors. Current flowing in the respective squirrel cage assemblies make loops that establish magnetic fields with north and south poles in the rotor. Preferably, the rotor conductors are wound to establish a set of inner rotor magnetic poles and a set of outer rotor magnetic poles. Certain of such poles are illustrated for example in FIG. 4, it being understood that magnetic poles would be spaced around the entire circumference of the rotor. Preferably, the rotor conductors are connected so that inner and outer magnetic poles in facing relationship have the same polarity.

The present invention provides flexibility and efficiency to motor operation. The motors as described above can be operated with both the inner and outer motor portions operating at full power. If less power is required, one motor portion can be run at less than full power while the other motor portion is allowed to operate at maximum power and efficiency. In the event one of the motor portions fails, the other portion can still be operated, thus providing backup capability. In the permanent magnet embodiment, the permanent magnets are removed from the rotor in the damaged stator side, thus preventing any induced current in the damaged stator windings. It will be apparent to those having ordinary skill in the art that the features of the present invention can be applied to various configurations of motors and generators without departing from the spirit and scope of the present invention, as set forth in the following claims.

We claim:

1. An electric machine comprising:

a machine housing and a shaft rotatively supported within said housing;

a rotor coupled to said shaft, said rotor including a set of inner magnetic poles and a set of outer magnetic poles;

an inner stator secured within said housing and an outer stator secured within said housing;

an inner air gap radially separating said inner stator from said inner rotor poles and an outer air gap radially separating said outer stator from said outer rotor poles;

a magnetic isolator positioned between said inner and outer rotor poles for magnetically isolating said inner rotor poles from said outer rotor poles to permit said electric machine to operate independently with said rotor interacting solely with said inner stator or independently with said rotor interacting solely with said outer stator.

2. An electric machine as in claim 1 wherein said rotor includes a first set of permanent magnets forming said inner magnetic poles and a second set of permanent magnets forming said outer magnetic poles.

3. An electric machine as in claim 1 wherein said rotor includes a first set of current carrying conductors forming said inner magnetic poles and a second set of current carrying conductors forming said outer magnetic poles.

4. An electric machine as in claims 1, 2 or 3 wherein said inner magnetic poles have a like magnetic polarity with said outer magnetic poles when in facing relationship.

5. An electric machine comprising:

a machine housing and a shaft rotatively supported within said housing;

a generally cylindrical rotor coupled to said shaft, said rotor including a central opening, an inner backiron and an outer backiron, and at least one inner permanent magnet removably connected to said inner backiron and at least one outer permanent magnet removably connected to said outer backiron;

a generally cylindrical inner stator secured within said housing, said inner stator being coaxial with said rotor and positioned within said rotor central opening, and a generally cylindrical outer stator secured within said housing, said outer stator being coaxial with said rotor and being positioned in surrounding relationship to said rotor;

an inner air gap separating said inner stator from said at least one inner permanent magnet and an outer air gap separating said outer stator from said at least one outer permanent magnet;

a magnetic isolator positioned between said inner and outer rotor backirons for magnetically isolating said inner backiron from said outer backiron to permit said electric machine to operate independently with said rotor interacting solely with said inner stator or independently with said rotor interacting solely with said outer stator.

6. An electric machine as in claim 5 wherein said at least one inner permanent magnet and said at least one outer permanent magnet have a like magnetic polarity when in facing relationship.

7. An electric machine comprising:

a machine housing and a shaft rotatively supported within said housing;

a generally cylindrical rotor coupled to said shaft, said rotor including a central opening, an inner set of rotor conductors wound on a set of inner rotor laminations and an outer set of rotor conductors wound on a set of outer rotor laminations;

a generally cylindrical inner stator secured within said housing, said inner stator being coaxial with said rotor and positioned within said rotor central opening, and a generally cylindrical outer stator secured within said housing, said outer stator being coaxial with said rotor and being positioned in surrounding relationship to said rotor;

an inner air gap separating said inner stator from said rotor inner laminations and an outer air gap separating said outer stator from said rotor outer laminations;

a magnetic isolator positioned between said inner rotor laminations and said outer rotor laminations for magnetically isolating said inner rotor laminations from said outer rotor laminations to permit said electric machine to operate independently with said rotor interacting solely with said inner stator or independently with said rotor interacting solely with said outer stator.

8. An electric machine as in claim 7 wherein said inner set of rotor conductors interacts with said inner stator to form a set of rotor inner magnetic poles, and said outer set of rotor conductors interact with said outer stator to form a set of rotor outer magnetic poles, and wherein said inner magnetic poles have a like magnetic polarity with said outer magnetic poles when in facing relationship.

9. An electric machine as in claims 1, 5 or 7 wherein said magnetic isolator is made of stainless steel.

10. An electric machine as in claims 1, 5 or 7 wherein said magnetic isolator is made of a material selected from the group of titanium, brass, aluminum, bronze and magnesium.

* * * * *